United States Patent [19]

Smith

[11] 4,018,697
[45] Apr. 19, 1977

[54] FUEL CYCLE MANAGEMENT
[75] Inventor: Alvin E. Smith, Arcadia, Calif.
[73] Assignee: Atlantic Richfield Company, Los Angeles, Calif.
[22] Filed: May 2, 1975
[21] Appl. No.: 574,078
[52] U.S. Cl. .......................... 252/301.1 R; 176/16; 176/30
[51] Int. Cl.$^2$ ...................................... G21C 19/44
[58] Field of Search ............... 252/301.1 R; 176/16, 176/30

[56] References Cited

UNITED STATES PATENTS

| | | | |
|---|---|---|---|
| 3,167,479 | 1/1965 | Feng | 176/16 |
| 3,254,030 | 5/1966 | Michaud et al. | 252/301.1 R |
| 3,503,848 | 3/1970 | Ransohoff et al. | 176/16 |
| 3,804,772 | 4/1974 | Lane et al. | 252/301.1 S |

OTHER PUBLICATIONS

Stoller et al., eds., Reactor Handbook, vol. II, Fuel Reprocessing, Interscience Publishers, Inc., New York, 1961, p. 464.
Sprague, Herbert O.; "Fuel Cycle Effect of U-236 in Recycled Uranium", presented at the 1974 Annual Meeting of American Nuclear Society, June 25, 1974, 16 pp.

*Primary Examiner*—Benjamin R. Padgett
*Assistant Examiner*—Deborah L. Kyle
*Attorney, Agent, or Firm*—John R. Ewbank

[57] ABSTRACT

Nuclear fuel is employed for a first cycle in a light water reactor and thereafter subjected to reprocessing for the removal of fission products, for the removal of higher actinides, for the recovery of plutonium, and for the recovery of uranium. Such recovered uranium includes about 0.1 to about 0.7 per cent uranium 236. Higher concentrations of U-236 in subsequent cycles are plausible. The difficulties attributable to the U-236 isotope are managed by separately enriching the recovered uranium to provide an upgraded fraction containing from about 1.0 to about 3 per cent U-235. From 30 to 60 per cent of U-236 initially present can be shifted to the tails fraction, with only about 40 to about 70 per cent of the U-236 in the enriched fraction. The U-236 tends to follow the U-235 in the enrichment step so that the U-236 concentration (as distinguished from distribution of total U-236) in the upgraded fraction is greater than initially. Such enriched upgraded recovered uranium is mixed with plutonium to provide a mixed oxide fuel containing from about 1 to about 7 per cent plutonium oxide. No enriched uranium derived from virgin uranium is mixed with or diluted with recovered uranium because of the significant penalty attributable to the presence of the U-236 isotope, particularly in the dilute parasite range.

5 Claims, No Drawings

FUEL CYCLE MANAGEMENT

FIELD OF THE INVENTION

This invention relates to the management of the fuel cycle for the purpose of employing uranium throughout a series of cycles of use as nuclear fuel components in a nuclear reactor of the light water type such as a pressurized boiling water reactor or a boiling water reactor.

PRIOR ART

Virgin uranium contains no U-236, which can be formed by neutron capture by U-235 when sufficiently concentrated U-235 is subjected to adequate neutron flux. About one-seventh of the consumed U-235 undergoes neutron capture instead of fission. An article by Herbert O. Sprague entitled "Fuel Cycle Effect of U-236 in Recycled Uranium", as presented at the American Nuclear Society in Philadelphia on June 25, 1974, notes that the adverse effect of any concentration of U-236 is independent of the U-235 enrichment throughout the range of U-235 concentrations likely to be encountered in new or depleted fuel rods for light water reactors. When uranium containing the 236 isotope is used as a nuclear fuel, the concentration of fissile material in the fuel to produce the same energy must be greater than in fuel derived only from virgin source uranium. Repeated recycling of uranium with additional U-235 employed in each cycle to compensate for the presence of the residual U-236 from the previous accumulated cycles could lead to cascadingly higher concentrations of U-236.

The U-236 problem has been a long-standing difficulty with widespread awareness of significant incentives and financial rewards for adequately coping with such problem.

SUMMARY OF THE INVENTION

In accordance with the present invention, a uranium composition is recovered from spent fuel rods in a reprocessing plant in which higher actinides and fission products are removed and in which plutonium is recovered. Such recovered uranium composition contains less than 2 percent (usually less than 1 percent) but more than 0.4 percent uranium 235 and contains from about 0.05 to about 1 percent uranium 236. If the invention has been practiced for a sufficient number of fuel cycles to reduce the U-236 concentration below 0.05 percent by conversion to higher actinides, then further practice of the invention is appropriate but not necessary. Such U-236 is formed from U-235 by neutron capture. The cross section of U-235 for fission is about 545 barns and for neutron capture the cross section of U-235 is about 100 barns. About 15.5 percent of the consumed U-235 is converted to U-236. After being formed in the reactor, some of the U-236 is converted to higher actinides prior to uranium recovery, so that the quantity of U-236 in depleted fuel is dependent in part upon the total history of the fuel. The amount of U-235 consumed in a cycle is generally less than 3.7 percent of the heavy element components in the nuclear fuel.

Such recovered uranium composition is managed to avoid admixture with fresh uranium and/or enriched uranium derived from fresh uranium. Of particular importance, a separate enrichment facility is provided, usually at the reprocessing plant, for enriching the recovered uranium composition without admixture with streams derived from fresh uranium (i.e., uranium not previously employed in a nuclear reactor). Such enrichment of the recovered uranium composition increases the U-235 concentration to within a range from about 1.0 percent to about 3 percent and usually also simultaneously increases the U-236 concentration. The total amount of U-236 recovered in the enriched fraction is within the range from about 40 percent to about 70 percent of the total U-236 present in a batch of recovered uranium composition prior to enrichment. The concentration of the U-236 in the enriched fraction is influenced by the feed to product ratio for the enrichment step. The presence of U-236 creates problems, including the need for additional amounts of fissile material, as has been previously recognized. The present invention particularly stresses avoidance of dilution with any uranium except recycled uranium, whereby the present invention avoids the increased penalty attributable to the presence of U-236 in high dilution. The present invention emphasizes the economic significance of the dilute parasite effect by preferentially concentrating the U-236 concurrently with concentrating the recovered U-235.

Plutonium compounds are employed for providing the fissile material needed in the recycled fuel to the extent that they are not provided by the U-235 content of the upgraded uranium from the enrichment step. The concentration of the plutonium oxide in the mixed oxide fuel is within the range from 1 percent to 7 percent by weight. The amount of fissile plutonium is within a range from about 40 percent to 90 percent of the total plutonium.

For a variety of reasons, light water reactor fuel containing plutonium employs plutonium containing the happenstance concentration of isotopes without enrichment. A portion of the non-fissile plutonium is transmuted to higher actinides in the high neutron flux of a nuclear reactor.

In achieving equivalent fuel activity, more fissile plutonium must be used than if U-235 were the fissile component. In some situations, it is appropriate to base engineering calculations upon the assumption that fissile plutonium weighing 1.25 times a given weight of uranium-235 has a fuel value equivalent to such uranium-235. Notwithstanding such need for larger amounts of plutonium, such procedure is advantageous because successive recycling eventually converts U-236 to higher actinides, thus avoiding the propensity for cascading increases of U-236 concentrations on recycling uranium fuel employing U-235 as the only fissile component. The recycled mixed oxide fuel is substantially free from virgin uranium or from enriched uranium derived from virgin uranium, either of which would dilute the U-236. Strict avoidance of such dilution of U-236 in virgin uranium is a concept which is an important feature of the invention.

DETAILED DESCRIPTION OF THE INVENTION

The invention can be best understood by recognizing what has been recommended in the prior art in regard to the recycling of uranium through several series of fuel cycles. It has been assumed that the virgin uranium would be subjected to enrichment in a gaseous diffusion plant to provide a stream of uranium hexafluoride containing the U-235 isotope in a concentration within the range from about 2 percent to about 5 percent. Such enriched uranium is fabricated into the first cycle fuel rod and employed for generating power.

In the fuel management system previously proposed, it was planned that the spent fuel rods would be treated at a fuel reprocessing plant to provide a uranium composition which would be mixed with virgin uranium for enrichment in a gaseous diffusion plant. The plutonium oxide recovered from the reprocessing plant was scheduled for admixture with virgin uranium. There have also been proposals for the use of fuels containing two kinds of fissile material, that is, plutonium oxide and uranium oxide. Such proposals have generally contemplated use of fresh uranium. There have been proposals for using uranium having an enriched U-235 content.

For a variety of reasons, the contemplated utilization of recovered uranium on large scale operations has not occurred in the United States. There is a transition period between the abandonment of plans for operating initially contemplated reprocessing plants and the planning of what is hoped may be more appropriate reprocessing plants. Just how a reprocessing plant is designed or operated depends in part upon the fuel cycle management. Whether this invention is accepted prior to significant usage of recovered uranium in fuel rods or after some of the potential trouble attributable to the presence of U-236 in recycled fuel has been more emphatically demonstrated, this invention can maintain recovered uranium as a valuable material by maintaining the correct standards for its conversion into an upgraded material appropriate for recycled nuclear fuel.

In accordance with the present invention, none of the recovered uranium is allowed to be admixed with virgin uranium or with enriched uranium derived from virgin uranium. Instead, the recovered uranium composition is subjected to an isotope enrichment step in a facility functioning only for such recovered uranium stream. Gaseous centrifuge facilities and/or ion exchange facilities are suitable for the small volume enrichment plant, thereby avoiding the capital costs inherent in a gaseous diffusion plant. Thus, a reprocessing plant would desirably have access to an enrichment facility, and the minimum size reprocessing plant would be influenced by the engineering for the minimum size enrichment facility.

Substantially all of the plutonium oxide recovered from the reprocessing of the fuel might ordinarily be employed directly in making the recycled fuel. By using the plutonium predominantly within the battery limits of the reprocessing plant, the security hazards of off-plant shipments of purified plutonium compositions are significantly reduced in preferred embodiments of the invention.

In preferred embodiments of the invention, the fissile plutonium content of the mixed oxide fuel is high enough that U-236 is converted to higher actinides more rapidly than it is produced during the recycling of the fuel through the nuclear reactor. Oftentimes the amount of plutonium appropriate for the batch of recycled rods is substantially the same as the amount of plutonium recovered from such batch of spent rods. However, there is the flexibility for using more or less plutonium than recovered from the batch of spent rods, because the significant criteria for the fuel cycle management is to use the available plutonium to both compensate for the presence of U-236 and to care for any deficiency of U-235 in the upgraded fraction of recovered uranium. The batch of recycled rods is necessarily a smaller batch than the batch of spent rods because from 33 to 90 percent of the recovered uranium is rejected in the tails fraction if the product to feed ratio for enrichment is within a range from about 1.5 to 10. The product to feed ratio is selected within such range to achieve inexpensive fuel in view of the cost and availability of plutonium and the cost and availability of varying degrees of enrichment of the recovered uranium.

In conventional multi-stage enrichment processes for increasing the concentration of U-235 relative to U-238, any U-236 in the feedstock tends to flow in significant amounts toward the U-235 stream. Thus, the U-236 concentration is increased concurrently as the U-235 concentration is increased. However, from about 30 percent to about 60 percent of the initial total content of U-236 moves toward the tails fraction containing U-238 in a concentration slightly higher than in the feedstock. The present invention features the discovery that if the enrichment of the recovered uranium is controlled to increase the U-235 concentration to at least 150 percent of its concentration in the recovered uranium, and if such U-235 concentration in the upgraded fraction is within the range from 1 percent to 3 percent then the problems concerned with the U-236 content can be satisfactorily managed in the recycled fuel. The total amount of U-236 in such upgraded fraction is thus from 40 percent to 70 percent of the total U-236 content in a batch of recovered uranium. The enrichment step is regulated to achieve a concentration of U-236 in the upgraded fraction which is always within the range from 0.05 to 2 percent and which is usually greater than in the recovered uranium. Such upgraded uranium is useful for mixed oxide fuels. The present invention features a surprising discovery, inasmuch as the amount of supplemental plutonium employed in the mixed oxide formulation is adjusted to cope with the resulting concentration of U-236 and to cope with the deficiency of U-235. The amount of available plutonium is sometimes a significant factor in regulating the enrichment step.

Security problems related to plutonium can be lessened by decreasing off-plant shipments of purified plutonium compositions. Because at least a significant portion of the plutonium recovered in the reprocessing plants is employed in the mixed oxide fuel prepared within battery limits, preferred embodiments of the present invention help decrease the security problem. Most fuel for light water reactors employs diluted fissile material in the oxide form, but because there have been proposals for use of carbides, nitrides, and/or other compositions, the term "mixed oxide fuel" is intended to embrace all light water nuclear fuels initially containing both plutonium compounds and fissile uranium compounds and is not restricted merely to oxides.

Subsequent cycle fuel prepared in accordance with the present invention is necessarily a mixture of uranium and plutonium compositions, and may be of the carbide or oxide or other operable type. In preferred embodiments of the invention, a solution containing a mixture of plutonium and uranium compositions is treated so that the resulting precipitate is an intimate atomic mixture of plutonium and uranium compositions. Once formed, such intimate atomic mixture, conveniently designated as a coprecipitated mixed oxide, requires security vigilance which is less than for purified plutonium oxide and/or mixtures of powders comprising plutonium oxide powder.

The invention is further clarified by reference to a plurality of examples.

EXAMPLE 1

A nuclear power plant requires for each reloading about 30 tons of nuclear fuel equivalent to 3.3 percent U-235 in purified virgin uranium oxide. A batch of spent rods is reprocessed, the mechanical losses being about 1 percent. The spent fuel contains 0.79 percent U-235 and 0.45 percent U-236, but based upon $UO_2$ content, the recovered uranium contains 0.827 percent U-235 and 0.47 percent U-236. Such uranium is enriched by 1.62 separative work units per kilogram of product at a feed to product ratio of 3.2252 to provide an upgraded fraction of about 8.8 tons (29.3 percent of reload requirements) containing 2.01 percent U-235 and 0.823 U-236.

The spent fuel contains about 0.91 percent plutonium of which about 72 percent is fissile, providing a fuel equivalency (based upon 1.25 percent fissile plutonium equalling 1 percent U-235) of 0.515 percent. A batch of fuel weighing about 9.09 tons is prepared by coprecipitating in atomic intimacy the recovered plutonium and the upgraded uranium, such fuel containing 1.953 percent U-235, 2.846 percent plutonium (equivalent to 1.623 percent U-235) and about 0.823 percent U-236. At this concentration, the amount of extra U-235 needed to compensate for the U-236 is only about one-third of the U-236 concentration even though about three-fifths (60 percent) of the U-236 concentration is required at concentrations such as 0.05 percent described as the dilute parasite effect. The avoidance of such dilute parasite effect by working with concentrations of U-236 permitting compensation with U-235 at about 33 percent instead of about 60 percent represents a significant advantage of the present invention.

Approximately 0.276 percent U-235 (or equivalent) is necessary to compensate for such 0.823 percent U-236, and it is for this reason that the recycled fuel is designed to be 3.576 percent equivalent U-235 to provide fuel value corresponding to 3.3 percent virgin U-235. Because such adjustment for the presence of U-236 is achieved by including about 0.346 percent fissile plutonium (125 percent of 0.276 percent contained in about 0.480 percent plutonium (72 percent fissile) instead of U-235 and because prolonged exposure of U-236 to the nuclear reactor leads to transmutation to higher actinides, additional U-236 is not generated as a part of the measures for its presence. Moreover, because only about 55 percent of the fissile equivalency is U-235, the marginal production of U-236 during a second cycle is lessened. The mixed oxide fuel tends to produce less U-236 for a given U-235 content permitting patterns of transmutation of more U-236 than generated when the fissile plutonium contributes more than about 66 percent of the fuel value The 9.09 tons of mixed oxide fuel can be employed in making fuel rods for about 30.3 percent of the reloading and 69.7 percent of the rods can be made from virgin uranium.

On recycle of such 30 tons of fuel, the depleted rods would contain about 0.78 percent U-235, about 0.65 percent U-236 and about 1.34 percent plutonium. After enrichment of the recovered uranium at a feed to product ratio of 2.79, employing 1.0924 separative work units per kilogram of product, there are 10.34 tons of upgraded uranium containing 1.5 percent U-235 for use in the coprecipitation zone, from which are recovered 10.743 tons of mixed oxide fuel containing about 3.75 percent plutonium.

Nuclear fuel materials are so costly that the return on investment on materials being processed can be a significant factor in the marginal cost of nuclear fuel. Fuel cycle management systems must be evaluated in part upon the time required to convert spent rods into nuclear fuel rods suitable for recycling. The speed with which the spent rods could be subjected to reprocessing, the recovered uranium enriched to provide the upgraded fraction, the coprecipitation to provide mixed oxide fuel and the manageability of following similar procedures through a series of recycling steps, represents one of the advantages of the present invention.

EXAMPLE 2

A pressurized water reactor is operated with fuel rods in three different zones containing no initial plutonium and containing 3.020 percent 3.240 percent, and 3.670 percent U-235, or an average enrichment of 3.533 percent. At the time when a batch of about one-third of the rods is removed, the U-235 content of the nuclear fuel (based upon the initial weight of the fuel) was about 0.85 percent The casing for the rod is not deemed a part of the nuclear fuel composition. The consumption of 2.683 percent U-235 produced about 0.1 percent higher actinides, fission products of the magnitude of 2.167 percent, about 0.943 percent plutonium, and about 0.416 percent U-236. The spent fuel is reprocessed to remove higher actinides, to remove fission products, and to recover substantially all of the 0.943 percent plutonium, and to provide a uranium nitrate stream containing that derived from the 0.416 U-236 and 0.85 percent U-235. After adjusting the percentages to be based upon the recovered uranium composition instead of the initial nuclear fuel, the purified uranium composition corresponds to 0.430 percent U-236 and 0.88 U-235 and 98.69 percent U-238. Such uranium stream is subjected to isotope enrichment to permit rejection of a tails fraction containing less than 0.88 percent U-235 and an upgraded fraction containing U-235 in a concentration greater than 1.00 percent but less than 3 percent.

Of particular importance, the isotope enrichment process is conducted with a strategy based upon relative costs of equivalent fuel value in the available plutonium and available U-235. The product to feed ratio for the enrichment step is within the range from 1.5 to 10, and the U-235 concentration in the upgraded fraction is at least 50 percent greater than the U-235 concentration in the recovered uranium. The U-236 concentration is increased concurrently with the increase in concentration of U-235. The tails contains about 30 percent to 60 percent of the total U-236 content of a batch of nuclear fuel throughout the contemplated range of enrichment. Thus, the upgraded fraction contains from 40 percent to 70 percent of the total U-236 in the recovered uranium. Typically, the U-236 concentration is increased from the 0.416 percent concentration in recovered uranium stream to a concentration of about 0.60 percent in the upgraded fraction, corresponding to about a 45 percent increase in U-236 concentration. The U-235 concentration is increased to within a range from about 1.01 to 1.40 percent in desirable embodiments. If enrichment costs are relatively cheap compared with fissile plutonium costs in preparing recycled fuel equivalent to above about 3.5 percent U-235, then the enrichment might be conducted to provide an upgraded fraction containing about 3 percent U-235 and the product to feed ratio would be adjusted so that from about 40 percent to 70 percent of the total U-236 would be in the upgraded fraction The present invention emphasizes conducting a cascade of isotope enrichment operations sufficient to meet the specifications of U-235, thereby preparing a fraction having an upgraded concentration of U-236. The choice of method and/or apparatus (e.g., gas centrifuge or ion exchange bed) excludes gaseous diffusion for enrichment because small scale enrichment as distinguished from large scale enrichment is necessary to adapt to problems inherent in fuel reprocessing.

Although it has been proposed that enriched uranium containing, for example, 6 percent U-235, be mixed with about an equivalent of recovered uranium to provide nuclear fuel containing about 3 percent U-235, such proposal is less advantageous than the present invention. Recycling of fuel containing a mixture of virgin and recovered uranium could lead to a recovered subsequent cycle uranium containing cascading increases in the percent U-236 to unmanageable levels. Reliance only upon U-235 to overcome the U-236 problem could involve eventually troublesome concentrations of U-236. Such cascading accumulation of U-236 in repeated cycles of recovering uranium significantly influences the economic attractiveness of recovered uranium. In order to compensate for the presence of U-236, larger amounts of U-235 are required to achieve a fuel value equal to fuel fabricated purely from virgin uranium. Recycling of recovered uranium has been argued as an advantage of nuclear power. Some of the presently available factors concerning the cascading cumulative penalty for the presence of the U-236 isotope indicate that most previous proposals cannot be profitable as long as enriched virgin uranium is available at an attractive price. The profitability and attractiveness of reprocessing and fuel recycling are dependent on price systems and fuel cycle management concepts different from those governing early proposals for fuel recycling.

Plutonium is employed in fabricating a mixed oxide fuel having characteristics approximately equivalent to enriched uranium containing an amount of U-235 isotope within the 2 percent to 5 percent range. The neutron fission cross section for the Pu-239 and Pu-241 isotopes is higher than the fission cross section of U-235, so that some local peaking of power generation can occur in using mixed oxide fuel. Whatever engineering problems related to such reactor operation occur are manageable as long as there is an assurance of a supply of appropriately priced nuclear fuel. The present invention can use the same amount of plutonium as recovered from the batch of spent rods or more or less than such amount, in accordance with the engineering requirements of the market. In any event, the plutonium concentration is adjusted to be sufficent not merely to compensate for the U-236 but also to cope with the deficiency of U-235 in the upgraded fraction, such plutonium concentration being kept within the range from 1 percent to 7 percent. The concentration of fissile plutonium in plutonium produced in a light water reactor varies because of the many variables affecting reactor operation, but is generally within the range from 40 percent to 90 percent.

The upgraded fraction of uranium in this example contains from about 1.0 to about 1.4 percent U-235 and about 0.6 percent U-236 and represents about 62 percent of the recovered uranium (about 38 percent to tails while keeping a feed to product ratio of about 1.6. The 0.943 percent plutonium of the spent rods can amount to about 1.5 percent of the mixed oxide fuel. About 80 percent of such plutonium is fissile, representing about 1.2 percent fissile plutonium. Plutonium derived from other sources is employed to increase the total fissile plutonium content to 3.5 percent. It is necessary to use about 1.25 times as much fissile plutonium to achieve the equivalent fuel value of U-235 fuel. Thus, the 3.5 percent fissile plutonium has an equivalence to about 2.8 percent U-235, which when combined with the 1 percent U-235 concentration of the upgraded fraction provides a gross fissile concentration equivalent to about 3.8 percent U-235 and after compensating for the 0.6 percent U-236, the fuel equivalent is about 3.6 percent U-235.

Of importance is the fact that by keeping the plutonium concentration so relatively high, the U-236 does not sharply increase during repeated cycles. Desirably, some of the U-236 is transmuted to higher actinides which can be separated during reprocessing. Instead of a cascading cumulative penalty for the presence of U-236, the present invention features the use of plutonium concentrations high enough to favor at least stabilization and desirably reduction of the U-236 isotope. However, the present invention also features the advantages of mixed oxide fuels and the significantly better results attributable to the presence of at least 1 percent (as distinguished from the 0.7 percent of virgin uranium).U-235 in the mixed oxide fuel.

EXAMPLE 3

A pressurized water reactor has fuel rods in three zones having initial U-235 enrichments of 2.440, 2.780, and 3.480 for an average of 3.140 percent, and operates for 28,900 megawatt days per metric ton of uranium. The batch of spent rods removed represents 33.1 percent of the fuel inventory. The spent rods contain 0.986 percent U-235, corresponding to a U-235 consumption of 2.494 percent. The U-236 concentration of the spent rods is 0.387 percent. The higher actinides correspond to about 0.1 percent and fission products are about 2.0007 percent. Plutonium concentration is about 0.972 percent. The U-238 concentration is about 94.548 percent. After the removal of the plutonium, actinides, and fission products, the recovered uranium has an isotopic distribution expressed as a concentration of about 0.399 percent U-236, about 1.017 percent U-235, and about 98.584 percent U-238.

The recovered uranium nitrate solution is converted to uranium hexafluoride and enriched in a cascade of gaseous centrifuge systems adapted to prepare a tails fraction containing U-235 in a concentration less than 1.017 percent and an upgraded fraction containing more than 1.017 percent U-235. Particular attention is directed to the regulation of the enrichment step to achieve a minimum of 50 percent increase in U-235 concentration, thereby also increasing the U-236 concentration. The upgraded uranium hexafluoride is converted to an aqueous solution of a uranium salt and mixed with an aqueous solution of a plutonium salt recovered from the spent rods. Because the upgraded fraction is only 40 percent of the recovered fraction, the 0.972 percent concentration of plutonium in the spent rod corresponds to 2.43 percent plutonium in the mixed nuclear fuel. Plutonium purchased from other sources increases the total plutonium concentration to 6 percent of which 3.6 percent constitutes fissile plutonium, having a fuel value equivalent to 2.88 percent U-235. Moreover, the upgraded fraction is enriched to about 1.52 percent so the fissile components correspond to about 4.4 percent U-235.

By preparing the mixed oxide fuel composition by coprecipitation from a solution containing both plutonium and uranium, there is an intimate atomic mixture of the oxides, thus making more difficult any unlawful separation of the plutonium from the mixed oxide fuel. The security precautions within the battery limits of the reprocessing facility and fuels fabrication facility are appropriate for protecting purified solutions of plutonium nitrate, but the fuel rod containing the mixed oxide fuel is manufactured so that it can be dealt with at a nuclear plant without the marginal costs of additional security being prohibitive.

EXAMPLE 4

A boiling water reactor having three zones for fuel rods initially (at the beginning of a cycle for a new batch of rods) having U-235 concentrations of 1.930, 2.326, and 2.820 percent, respectively is operated with a plan for obtaining about 29,000 megawatt-days per metric ton of uranium. A batch of one-third of the fuel rods are withdrawn as spent fuel rods and transferred to the plant comprising a reprocessing facility, a cascade of gaseous centrifuge systems for enrichment and a fabrication facility permitting remote control manufacture (i.e., complete containment of zone handling plutonium compositions) of mixed oxide fuel rods.

The spent fuel rods contain, based upon initial fuel weight, about 0.8 percent U-235, about 0.3 percent U-236, about 1.555 percent fission products, about 0.1 percent higher actinides, about 0.896 percent plutonium, and about 96.2 percent U-238. After removal of the fission products, higher actinides, and plutonium, the purified uranium contains 0.885 percent U-235, 0.311 percent U-236 and 98.804 percent U-238. Such recovered uranium is enriched in a cascade of ion exchange beds to provide an upgraded fraction containing 1.2 percent U-235 and about 0.45 percent U-236 (about 150 percent of the concentration in the recovered uranium). An aqueous solution containing the upgraded uranium plus 90 percent of the recovered plutonium (thus illustrating usage of less than all the plutonium present in the spent rods) is subjected to coprecipitation to prepare mixed oxides containing 2.016 percent plutonium. The mixed oxide fuel is useful recycle fuel which can be used in an appropriate reactor without forming excessive amounts of U-236.

Various modifications of the invention are possible without departing from the scope of the appended claims.

It is claimed:

1. In a fuel cycle management system in which fuel particles containing a predominant amount of a uranium compound and containing fissile material within the equivalent range from about 2 percent to about 5 percent uranium-235 are employed for generating energy in a light water nuclear reactor and in which the depleted fuel is reprocessed to remove higher actinides, to remove fission products, to recover plutonium, the recover a uranium composition containing less than 2 percent but more than 0.4 percent uranium-235, said recovered uranium composition containing uranium-236, and in which fuel particles comprising such recovered uranium are employed in another cycle of energy generation in a light water nuclear reactor, the improvement which consists of:

selectively enriching a stream of recovered uranium composition derived substantially exclusively from depleted fuel, said stream being substantially free from uranium which has not been cycled through a nuclear reactor, to provide a rejected tails fraction and an upgraded fraction containing a concentration of uranium-235 greater than in said recovered uranium, such concentration being within a range from 1 percent to 3 percent of uranium-235, said upgraded fraction containing less than 70 percent but more than 40 percent of the total quantity of uranium-236 isotope in the recovered uranium, the U-236 concentration in a sample of the upgraded fraction always being greater than the U-236 concentration in the corresponding sample of the recovered uranium prior to said enrichment, said U-236 concentration in the sample of upgraded fraction being within a range from 0.05 percent to 2 percent;

admixing said upgraded fraction with plutonium compounds and employing such admixture to provide nuclear fuel comprising both uranium and plutonium and having a fuel value equivalent to that of virgin nuclear fuels containing between 2 percent and 5 percent uranium-235, the concentration of plutonium compound in said fuel being sufficient both to compensate for the presence of uranium-236 and to care for any deficiency of uranium-235 in the said upgraded fraction of uranium, such plutonium concentration being within the range from 1 percent to 7 percent by weight, said fuel being substantially free from uranium-235 derived from other than recovered uranium composition, said fuel containing at least 1.0 percent but not more than 3.0 percent uranium-235 attributable only to said upgraded fraction.

2. The method of claim 1 in which the enrichment of the depleted fuel is conducted in a gaseous centrifuge.

3. The method of claim 1 in which the enrichment of the depleted uranium is conducted in a bed of ion exchange resin.

4. The method of claim 1 in which the recovered uranium composition from first cycle fuel rods contains from about 0.1 to about 0.7 percent uranium-236, and in which the plutonium-uranium mixed fuel contains from 0.2 to about 2 percent uranium-236.

5. The method of claim 1 in which compositions containing mixtures of plutonium and uranium are coprecipitated in atomic intimacy from solutions containing both plutonium and uranium compositions.

* * * * *

UNITED STATES PATENT OFFICE
CERTIFICATE OF CORRECTION

Patent No. 4,018,697　　　　　Dated　April 19, 1977

Inventor(s)　Alvin E. Smith

It is certified that error appears in the above-identified patent and that said Letters Patent are hereby corrected as shown below:

Column 10, claim 1, line 3, "the" should read -- to --.

Signed and Sealed this twenty-sixth Day of July 1977

[SEAL]

Attest:

RUTH C. MASON
*Attesting Officer*

C. MARSHALL DANN
*Commissioner of Patents and Trademarks*